United States Patent [19]

Riew

[11] Patent Number: 4,489,008
[45] Date of Patent: Dec. 18, 1984

[54] HYDROXYL-TERMINATED LIQUID POLYMERS

[75] Inventor: Changkiu K. Riew, Akron, Ohio

[73] Assignee: The B. F. Goodrich Company, Akron, Ohio

[21] Appl. No.: 406,134

[22] Filed: Aug. 9, 1982

Related U.S. Application Data

[63] Continuation-in-part of Ser. No. 167,980, Jul. 14, 1980, abandoned, and a continuation-in-part of Ser. No. 952,165, Oct. 17, 1978, abandoned.

[51] Int. Cl.³ ............... C07C 121/66; C07C 121/46; C07C 121/417
[52] U.S. Cl. .................. 260/465.4; 260/464; 260/465 D; 546/190; 546/265; 548/519; 560/37; 560/155; 560/169; 562/448; 562/565; 564/152; 564/158; 564/201
[58] Field of Search ............... 260/464, 465.4, 465 D; 560/37, 155, 169; 564/152, 201, 158; 562/448, 565; 548/514; 546/190, 265

[56] References Cited

U.S. PATENT DOCUMENTS

| | | | |
|---|---|---|---|
| 3,135,716 | 6/1964 | Uraneck et al. | 260/45.5 |
| 3,346,631 | 10/1967 | Boyer et al. | 260/465.4 X |
| 3,431,235 | 3/1969 | Lubowitz et al. | 260/47 |
| 3,551,471 | 12/1970 | Siebert | 260/465.4 |
| 3,551,472 | 12/1970 | Siebert | 260/465.4 |
| 3,578,697 | 5/1971 | Marans | 260/465.4 |
| 3,699,153 | 10/1972 | Siebert | 560/124 UX |
| 3,712,916 | 1/1973 | Siebert | 560/76 X |
| 4,001,304 | 1/1977 | Nyi et al. | 260/465.4 X |
| 4,013,710 | 3/1977 | Skillicorn | 260/465.4 X |
| 4,207,238 | 6/1980 | Gilles | 260/465 D X |

OTHER PUBLICATIONS

Translation of D.R.P. 1,150,205, 6-12-1963.
Siggia, "Quantitative Organic Analysis via Functional Groups", pp. 452-456, John Wiley & Son, N.Y. (3rd Ed.).
C.A., 64, (1966), Kamyshan, 4933f.
Degering, "An Outline of Organic Nitrogen Compounds", Univ. Lithoprinters, 1945, p. 327.

Primary Examiner—Joseph Paul Brust
Attorney, Agent, or Firm—J. Hughes Powell, Jr.; Nestor W. Shust

[57] ABSTRACT

Hydrolytically stable hydroxyl-terminated liquid polymers that are useful in the preparation of polyurethanes prepared by reacting at least one aminoalcohol with a carboxyl-terminated liquid polymer having a carbon-carbon backbone. The hydroxyl-terminated polymers have the formula

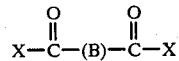

wherein B is a carbon-carbon backbone, X is HO— or HO—Y— a univalent radical obtained by removing a hydrogen atom from an amine group of aminoalcohol containing one primary or secondary hydroxyl group and one primary or secondary amine group per molecule, and the polymers contain an average of greater than 1.5 terminal hydroxyl groups per molecule.

6 Claims, No Drawings

HYDROXYL-TERMINATED LIQUID POLYMERS

CROSS REFERENCE TO RELATED APPLICATIONS

This is a continuation-in-part of my co-pending application Ser. No. 167,980, filed July 14, 1980, abandoned, a continuation in part of application Ser. No. 952,165, filed Oct. 17, 1978, abandoned.

BACKGROUND OF THE INVENTION

Hydroxyl-terminated liquid polymers containing ester groups are known in the art. For example, U.S. Pat. Nos. 3,551,472 and 3,699,153 disclose such polymers made by reacting carboxyl-terminated liquid polymers with a diol in the presence of an acid catalyst, and U.S. Pat. No. 3,712,916 discloses such polymers made by reacting a carboxyl-terminated liquid polymer with ethylene oxide in the presence of a tertiary amine catalyst. Ester groups present near the terminal portions of such polymers are rather prone to hydrolytic degradation and may reduce the useful life of products in which the polymers are used. New hydroxyl-terminated liquid polymers are desired having improved hydrolytic stability.

SUMMARY OF THE INVENTION

Hydroxyl-terminated liquid polymers are prepared by reacting at least one aminoalcohol with a carboxyl-terminated liquid polymer having a carbon-carbon backbone. The hydroxyl-terminated polymers have the formula

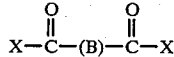

wherein B is a carbon-carbon backbone, X is HO— or HO—Y— a univalent radical obtained by removing a hydrogen atom from an amine group of aminoalcohol containing one primary or secondary hydroxyl group and one primary or secondary amine group per molecule, and the polymers contain an average of greater than 1.5 terminal hydroxyl groups per molecule.

DETAILED DESCRIPTION

The hydroxyl-terminated liquid polymers having improved hydrolytic stability are produced by reacting an aminoalcohol with a carboxyl-terminated liquid polymer having a carbon-carbon backbone. The resulting hydroxyl-terminated liquid polymers contain a major proportion of molecules of the formula

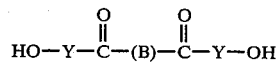

wherein HO—Y— is a univalent radical derived from and equivalent to that obtained by removing a hydrogen atom from an amine group of an alkyl, alicyclic, or alkyl substituted alicyclic amino-alcohol containing one primary or secondary hydroxyl group and one primary or secondary amine group per aminoalcohol molecule, with primary hydroxyl and amine groups being preferred, and 2 to 12 carbon atoms. B is a polymeric backbone consisting of carbon-carbon linkages. The polymers contain a major proportion: That is, more than 75 mole percent of molecules of (1) and less than 25 mole percent of molecules of the formula

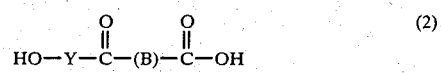

The hydroxyl-terminated liquid polymers contain an average of at least about 1.6 hydroxyl groups per molecule or from about 1.6 to 20 hydroxyl groups per molecule, preferably from about 1.7 to about 10 hydroxyl groups per molecule and more preferably about 1.8 to 4 hydroxyl groups. The fact that the average number may be slightly less than 2 is accounted for by the fact that not all hydroxyl-terminated molecules in a given sample may have hydroxyl groups at both ends of the molecule. Average numbers of hydroxyl groups per molecule above 2 are explained by the fact that additional hydroxyl group(s) may be located pendant to the polymer backbone. For example, an aminoalcohol will react with acrylic acid backbone unit(s) in the starting carboxyl-terminated liquid polymer as well as with end carboxyl group(s), resulting in both pendant and terminal hydroxyl functionality; hydroxyalkyl acrylates may be copolymerized in the backbone and the hydroxyl is thus pendant thereto, and the like. Y may have the structure

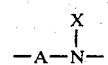

wherein A is either $(CH_2)_n$ where n is 1 to 12, or an alicyclic or alkyl substituted alicyclic radical containing 6 to 12 carbon atoms, X is hydrogen or an alkyl radical containing 1 to 8 carbon atoms, and N is nitrogen.

The hydroxyl-terminated liquid polymers of this invention have Brookfield viscosities (measured using a Brookfield RVT viscometer at 27° C.), from about 200 cps to about 2,500,000 cps or more, more preferably from about 300 cps to about 1,200,000 cps. The hydroxyl-terminated liquid polymers also have hydroxyl equivalent weights (gram molecular weight per hydroxyl group) from about 300 to about 4,000, more preferably from about 300 to 2,500.

The polymeric carbon-carbon backbone is derived from carboxyl-terminated liquid polymers used as starting materials that may have Brookfield viscosities from about 300 cps to about 2,500,000 cps, more preferably from about 300 cps to about 1,200,000 cps, and have a backbone of carbon-carbon linkages. The backbone of these polymers contains about 60 to 100 weight percent polymerized units of vinylidene monomers having at least one terminal $CH_2=C<$ group and selected from the group consisting of (a) monoolefins containing 2 to 8 carbon atoms, such as isobutylene, 1-butene, 1-pentene, 1-hexene, and the like; (b) dienes containing 4 to 10 carbon atoms such as butadiene, isoprene, preferably 4 to 5 carbon atoms; cyclic dienes and the like, (c) vinyl and allyl ethers of alkyl radicals containing 1 to 8 carbon atoms such as vinyl methyl ether, allyl methyl ether, and the like; and acrylic acids and acrylates having the formula

wherein R is hydrogen or an alkyl or hydroxyalkyl radical containing 1 to 3 carbon atoms, and $R^1$ is hydrogen or an alkyl or hydroxyalkyl radical containing 1 to 18 carbon atoms, or an alkoxyalkyl, alkythioalkyl, or cyanoalkyl radical containing 2 to 12 carbon atoms, more preferably 2 to 8 carbon atoms. Even more preferably $R^1$ is hydrogen or an alkyl or hydroxyalkyl radical containing 1 to 8 carbon atoms. Examples of suitable acrylates include ethyl acrylate, butyl acrylate, hexyl acrylate, 2-ethylhexyl acrylate, dodecyl acrylate, octadecyl acrylate, 2-hydroethyl acrylate, methoxyethyl acrylate, butoxyethyl acrylate, hexylthioethyl acrylate, methyl methacrylate, ethyl methacrylate, octyl metacrylate, and the like. Often two or more types of these polymerized monomeric units are contained in the polymer backbone.

More preferred liquid polymers contain polymerized units of butadiene-1,3 or isoprene and acrylic acid acrylates wherein R is hydrogen or an alkyl radical containing 1 to 2 carbon atoms, and $R^1$ is hydrogen or an alkyl or hydroxyalkyl radical containing 1 to 8 carbon atoms.

The monomers described above may be copolymerized with from 0% to about 40% by weight, more usually from 0% to 30% by weight, of at least one other copolymerizable ethylenic monomers containing at least one terminal vinylidene group $CH_2<$. Suitable comonomers includes those selected from the group consisting of vinyl aromatics having the formula

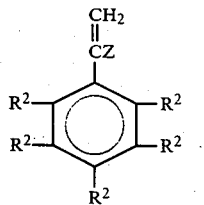

wherein Z is hydrogen or methyl $R^2$ is hydrogen, halogen or an alkyl or hydrooxyalkyl radical containing 1 to 4 carbon atoms, preferably wherein at least four $R^2$'s are hydrogen; such as styrene, α-methyl styrene, chlorostyrene, vinyl toluene, vinyl benzyl alcohol, and the like; vinyl nitriles having the formula

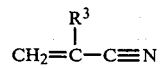

wherein $R^3$ is hydrogen or an alkyl radical containing 1 to 3 carbon atoms, preferably acrylonitrile, methacrylonitrile and ethacrylonitrile; polyfunctional cross-linking agents as divinyls and diacrylates such as divinyl benzene, divinyl ether, dialkylene glycol diacrylate and methacrylates; amides of α,β-olefinically unsaturated carboxylic acids containing 2 to 8 carbon atoms, preferably acrylamide or methacrylamide and methylol derivatives thereof as N-methylol acrylamide and methacrylamide; N-vinyl-2-pyrrolidone; hydroxy-containing vinylidene monomers for the purpose of including some random hydroxyl functionality, such as allyl alcohol, vinyl benzyl alcohol, and hydroxyalkyl acrylates containing 2 to 8 carbon atoms in the alkyl group; other different acrylic acids and acrylates, such as hexylthioethyl acrylate, β-cyaneothyl acrylate, cyanooctyl acrylate, isooctyl methacrylate, and the like not used in the backbone (B); vinyls esters as vinyl acetates, vinyl maleates, vinyl fumarates; and vinyl and vinylidene halides as vinyl chloride and vinylidene chloride. Often two or more types of these polymerized monomeric units are contained in the polymeric backbone, with vinyl nitriles, vinyl aromatics, and N-vinyl-2-pyrrolidone being useful.

Other useful vinylidene monomers include acrolein and methacrolein, divinyl ether, methallyl chloride, itaconic acid, vinyl and allyl esters of carboxylic acids containing 2 to 8 carbon atoms, vinyl chloroacetate, allyl chloroacetate, vinyl crotonate, vinyl cyclohexene, vinyl ethyl fumarate, nitrosytrene, alkoxy systems such as methoxy styrene, chloroprene, vinyl naphthalenes, vinyl piperidines, vinyl pyridines, N-vinyl pyrrolidines, vinyl stearate, vinyl sulfanilic acid, methyl vinyl sulfone, chloroethyl vinyl ether, vinyl benzychloride, alkyl alkaacrylates, β-chloroethyl vinyl phosponate and diacetone acrylamide, and other non-reactive, non-functional vinylidene ($CH_2<$) monomers may be present in amounts of 0 to about 20 weight percent. Any equivalent comonomers not interfering with the raction may be used.

A group of preferred comonomers may be selected from the group consisting of vinyl aromatics wherein $R^2$ is hydrogen, halogen, or an alkyl or hydroxyalkyl radical containing 1 to 4 carbon atoma; and wherein $R^3$ is hydrogen or an alkyl radical containing 1 to 3 carbon atoms, such as acrylonitrile and methacrylonitrile. For example, for use with the acrylates and butadiene-1,3 one could use acrylonitrile, methacrylonitrile, styrene, acrylic and methacrylic acid, alkylacrylates and methacrylates wherein the alkyl groups contain 1 to 8 carbon atoms, N-vinyl-2-pyrrolidone and hydroxyalkyl acrylates wherein the alkyl groups contain 1 to 8 carbon atoms, in amounts from 0 to about 35 weight percent of said comonomers with 65 or more weight percent of butadiene-1,3.

Typical examples of useful liquid polymeric backbones comprising carbon-carbon linkages include polyethylene, polyisobutylene, polyisoprene, polybutadiene, poly(vinyl ethyl ether), poly(ethylacrylate) and poly(butylacrylate) as well as copolymers of butadiene and acrylonitrile; butadiene and styrene; butadiene, butyl acrylate and acryonitrile; vinyl acetate and isoprene; vinyl ethyl ether and diallyl ether; vinyl ethyl ether and α-methyl styrene; methyl acrylate and butadiene; methyl acrylate and ethyl acrylate; methyl acrylate and butyl acrylate; methyl acrylate and 2-ethylhexyl acrylate; ethyl acrylate and ethylene; ethyl acrylate and isobutylene; ethyl acrylate and isoprene; ethyl acrylate and butadiene; ethyl acrylate and butyl acrylate; ethyl acrylate and vinyl acetate; ethyl acrylate and styrene; ethyl acrylate, styrene and butadiene; ethyl acrylate and n-butyl acrylate; ethyl acrylate, n-butyl acrylate, and 2-ethylhexyl acrylate; ethyl acrylate and 2-ethylhexyl acrylate; ethyl acrylate and acrylic acid; ethyl acrylate and acrylamide; ethyl acrylate and allyl alcohol; butyl acrylate, styrene and isoprene; butyl acrylate and 2-hydroxyethyl acrylate; butyl acrylate, ethyl acrylate, and 2-hydroxyethyl acrylate; butyl acrylate and styrene; butyl acrylate, ethyl acrylate and acryonitrile; butyl acrylate and vinyl benzyl alcohol; and the like.

When the acrylic acids and acrylates just described are used as comonomers in the backbone, transamidation reactions may occur to produce pendant hydroxyl functionally as shown in the following equation when employing 2-amino-1-ethanol to provide the pendant hydroxyl groups:

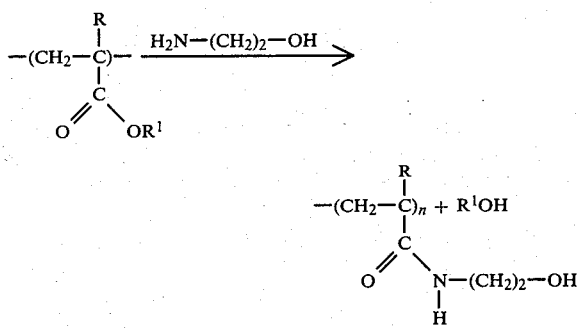

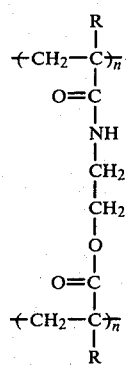

A further reaction by the pendant hydroxyls may occur, i.e., transesterification with another acrylate linkage, resulting in crosslinking and an increase in product viscosity:

$$\begin{array}{c} R \\ {+}CH_2{-}C{\rightarrow}_n \\ | \\ O{=}C \\ | \\ NH \\ | \\ CH_2 \\ | \\ CH_2 \\ | \\ O \\ | \\ O{=}C \\ | \\ {+}CH_2{-}C{\rightarrow}_n \\ | \\ R \end{array}$$

Liquid carboxyl-terminated polymers may be prepared by free-radical polymerization using carboxyl-containing initiators and/or modifiers as disclosed in U.S. Pat. No. 3,285,949 and German Pat. No. 1,150,205 and by solution polymerization using lithium metal or oganometallic compounds and post-treating the polymers to form carboxyl groups as disclosed in U.S. Pat. Nos. 3,135,716 and 3,431,235. The polymers can also be prepared by reacting liquid polymers having other than terminal carboxyl groups with compounds so as to yield carboxyl groups. For example, liquid halogen-terminated polymers can be reacted with unsaturated anhydrides in the presence of Lewis acids to yield carboxyl-terminated liquid polymers. Thus, it is seen that the method of preparing the liquid carboxyl-terminated polymers is not critical to the invention. The minimum essential features of the polymers are that terminal carboxyl groups be present together with a carbon-carbon polymeric backbone.

Examples of preferred carboxyl-terminated liquid polymers include carboxyl-terminated polyethylene, carboxyl-terminated polyisobutylene, carboxyl-terminated polybutadiene, carboxyl-terminated polyisoprene, as well as carboxyl-terminated poly(butadiene/acrylonitrile), carboxyl-terminated poly(butadiene/styrene), and carboxyl-terminated poly (butadiene/n-butyl acrylate). Carboxyl-terminated copolymers of butadiene with acrlonitrile or styrene were found to be especially useful. These polymers may contain from about 50% to about 99% by weight of butadiene −1,3 with 0 to 40% by weight of acrylonitrile or styrene and from about 1% to about 15% by weight of carboxyl, based upon the total weight of the polymer.

Aminoalcohols suitable for use in the process of this invention typically contain from 2 to 20 carbon atoms, more preferably from 2 to 10 carbon atoms, one primary or secondary hydroxyl group, and one primary or secondary amine group per molecule as the sole reactive or functional groups present, with primary hydroxyl and amine groups being preferred. Typical suitable aminoalcohols include 2-amino-1-ethanol, 2-amino-1-butanol, 1-amino-1-cyclopentanemethanol, 6-amino-1-hexanol, 2-amino-3-methyl-1-butanol, 2-amino-2-methyl-1-propanol, 5-amino-1-pentanol, 2-amino-1-phenylethyl alcohol, 1-amino-2-propanol, 3-amino-1-propanol, 2-benzylaminoethanol, N-$\beta$-hydroxy-ethylpiperazine, 2-anilinoethanol, 2-benzimidazole-methanol, 2-piperidinemethanol, 3-piperidinemethanol, 2-piperidineethanol, and o-, m- and p-aminobenzyl alcohol. Particularly useful are alkyl and cyclo-hexyl aminoalcohols containing 1 to 12 carbon atoms including aminoalkanol and cyclohexyl alkanols containing 2 to 8 carbon atoms. 2-amino-1-alkanols containing 2 to 6 carbon atoms are preferred. Excellent results were obtained using 2-amino-1-ethanol. Any aliphatic, alicyclic, heterocyclic or aromatic amino alcohol containing one primary or secondary amino group and one primary or secondary hydroxyl group that are equivalent to the above amino alcohols also may be used.

A solvent is not required for the process of this invention but may be used. Mixtures of solvents may also be used. Suitable solvents include aliphatic and cycloaliphatic ethers containing from 3 to 10 carbon atoms, more preferably from 3 to 6 carbon atoms, such as tetrahydrofuran, diethylether and the like. Also suitable as solvents and more preferred are aromatic compounds having the formula

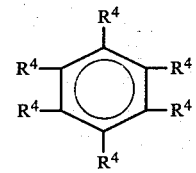

wherein $R^4$ is hydrogen or an alkyl radical containing 1 to 3 carbon atoms, and at least two $R^4$s are hydrogen. More preferably $R^4$ is hydrogen or an alkyl radical containing 1 or 2 carbon atoms, and at least three $R^4$s are hydrogen. Suitable aromatic solvents include benzene, toluene, o-, m- and p-xylene, o-, m- and p-diethylbenzene, cumene, mesitylene and the like.

A sufficient quantity of at least one amino-alcohol is reacted with a carboxyl-terminated liquid polymer in order to produce a hydroxyl-terminated liquid polymer containing at least about 1.5 hydroxyl groups per molecule. Typically the average number of total carboxyl groups in a liquid polymer before reaction will be from about 1.6 to about 20 groups per molecule, more preferably from about 1.7 to about 10 groups per molecule. In this typical case, from about 1.2 to about 6 amine equivalents, more preferably from about 1.2 to about 3 amine equivalents, of at least one aminoalcohol can be used per equivalent of carboxyl-terminated liquid polymer. Larger aminoalcohol amounts than 6 amine equivalents per equivalent of carobxyl-terminated liquid polymer may make purification (i.e., removal of unreacted aminoalcohol) of the hydroxyl-terminated liquid polymer more difficult but possible.

No catalyst is required, and many types of mixing apparatus can be used in the hydroxyl termination reaction. For example, simple mixers can be used, including turbine stirrers as well as propeller mixers. Reaction components can be combined in any order. The reaction mixture may be heated (or refleuxed if a solvent is used) at a temperature from about 80° C. to about 200° C., until more than 90% of carboxyl groups have reacted with aminoalcohol, i.e., until the amidation reaction is more than 90% complete. Reaction time is typically about 1 to 120 hours. Byproducts may be removed by evaporation or the like as they are formed (e.g., water from the carboxyl-amine reaction).

Low molecular weight diesters may be added at, near the end of, or after reaction in order to eliminate residual aminoalcohol by a transamidation reaction. Such diesters typically have molecular weights less than about 300, for example diethyl maleate, diethyl malonate, diethyl methylsuccinate, and the like. The diesters may also function as reactive plasticizers in subsequent curing reactions if not removed during purification.

The hydroxyl-terminated liquid polymers may be purified by vacuum distillation or by washing with a solvent such as a benzene-methanol mixture in order to remove the unreacted aminoalcohol, followed by drying the polymer. The structure of amide formed during preparation of the hydroxyl-terminated liquid polymers can be determined by infrared spectroscopy.

The following examples illustrate the present invention more fully.

EXAMPLE 1

Carboxyl-terminated Liquid Polymer

A carboxyl-terminated poly(butadiene/acrylonitrile) was prepared according to the general method of U.S. Pat. No. 3,284,959. The carboxyl-terminated liquid polymer had a viscosity of 112,000 cps using a Brookfield RVT viscometer at 27° C. and contained about 82.7 weight percent butadiene and about 10 weight percent acrylonitrile. The amount of 2-amino-1-ethanol required to react with a given amount of the carboxyl-terminated liquid polymer was calculated using the formula:

$$\frac{(\text{Ephr}_{COOH}) \times (\text{Mo. Wt.}_{AA}) \times \left(\frac{AA}{CTP}\right) \times (\text{Wt.}_{CTP})}{100}$$

where $\text{Ephr}_{COOH}$ = carboxyl equivalents per hundred weight parts of carboxyl-terminated liquid polymers;

$\text{Mol. Wt.}_{AA}$ = molecular weight of the aminoalcohol, i.e., 61 for 2-amino-1-ethanol;

$\frac{AA}{CTP}$ = desired ratio of amino equivalents of aminoalcohol to equivalents of carboxyl-terminated liquid polymer (CTP); and $\text{Wt.}_{CTP}$ = weight in grams of carboxyl-terminated liquid polymer (CTP).

Hydroxyl-terminated liquid polymers

A carboxyl-terminated liquid polymer produced by the method of U.S. Pat. No. 3,285,949 having an Ephr$_{COOH}$ of 0.053 and was reacted with 2-amino-1-ethanol in a 1.2 AA/CTP Ratio, i.e., 1006 grams of carboxyl-terminated liduid polymer was reacted with 39.0 grams of 2-amino-1-ethanol.

The following reaction procedure was used. A 2-liter, 4-necked flask was cleaned thoroughly with soat and water, rinsed first with water and then with acetone, and flushed with nitrogen until dry. The flask was equipped with an air stirrer, thermometer, nitrogen inlet tube, and Dean-Stark water trap with water condensor. The carboxyl-terminated liquid polymer and 2-amino-1-ethanol were charged to the flask with stirring together with 200 ml. toluene, and the reaction mixture was heated to about 150° C. using an oil bath. The flask was purged continuously with nitrogen during reaction. After final Ephr$_{COOH}$ of the reaction mixture was reduced to less than 10% of the initial Ephr$_{COOH}$, the gas inlet tube was replaced by a stopper, and the water condenser was connected to a vacuum pump. A vacuum (about 1 to mm Hg) was drawn on the flask and maintained for about 2 hours in order to remove some excess 2-amino-1-ethanol and other volatiles. The hydroxyl-terminated liquid polymer had a Brookfield viscosity value of 360,000 cps. at 27° C. using a Brookfield RVT viscometer and #4 spindle. It also had a Ephr$_{OH}$ of 0.042, Ephr$_{OH}$ being defined as the hydroxyl equivalents per hundred weight parts of hydroxyl-terminated liquid polymer.

Cure of the Hydroxyl-terminated Liquid Polymer

Several 10-gram portions of the hydroxyl-terminated liquid polymer described above were mixed with toluene diisocyanate in amounts varying from 0.49 gram to 0.6 gram. Each sample was placed individually in aluminum pans and cured for 2 hours at 100° C. in a circulating air oven. The products were found to be excellent cured rubbers.

EXAMPLE 2

Another hydroxyl-terminated liquid polymer was prepared and the above described hydroxyl-termination reaction was performed at 125° C. in the absence of toluene using a carboxyl-terminated liquid polymer having a Brookfield viscosity of about 112,000 cps. (measured using a Brookfield RVT viscometer at 27° C.), containing about 76.5 weight percent butadiene and about 16.4 weight percent acrylonitrile, and having an Ephr$_{COOH}$ of about 0.052. This polymer was reacted with 2-amino-1-ethanol in a 1.5 AA/CTP Ratio according to the following recipe:

| Material | Wt. (g) | Equivalents |
|---|---|---|
| Carboxyl-terminated liquid polymer | 1000 | 0.52 |
| 2-amino-1-ethanol | 47.6 | 0.779 |
| Diethyl Maleate | 23.5 | 0.273 |

The diethyl maleate was added after approximately 8 hours of reaction in order to eliminate residual 2-amino-1-ethanol. Total reaction time was about 12 hours.

The hydroxyl-terminated liquid polymers produced by the process of this invention contain amide groups adjacent to the polymer backbone and have improved hydrolytic stability compared to similar polymers (e.g., those of U.S. Pat. Nos. 3,551,472, 3,669,153 and 3,712,916) wherein ester groups are present. The novel polymers are useful together with polyisocyanates for open or centrifugal casting, liquid injection molding and the like to make thermoset elastomeric objects such as flexible automotive parts, (e.g., side shields and front ends), and can also be used as binders for belts, hoses or the like. For example, the hydroxyl-terminated liquid polymer of Example 1 is mixed with a molar excess of 4,4-diphenylmethylene diisocyanate, and then with enough ethylene glycol to react with the diisocyanate and cast to form an article. After heating to vulcanize this mixture, a solid, tough elastomeric polymer article is formed. This material has improved hydrolytic stability as compared to other hydroxyl-terminated liquid polymers of the type referred to above.

Another use for the novel hydroxyl-terminate liquid polymers of this invention is in making solvent-free pressure sensitive adhesives. First a prepolymer of polytetramethylene ether glycol and toluene diisocyanate was prepared to have molecular weight of about 1350 and to contain 6 weight percent NCO groups. This was mixed with a liquid hyroxyl-terminated polymer prepared in accordance with Example 1 in a hydroxylisocyanate equivalent ratio of 1.0. After mixing, the materials are spread on a mylar film and cured for two minutes at 150° C. The resulting materials are found to be very effective pressure sensitive adhesives which may be used to laminate structures for labels and the like. These hydroxyl-terminated liquid polymer products are also useful as epoxy resin tougheners as is described in the patent literature.

I claim:

1. A hydroxyl-terminated liquid polymer consisting essentially of more than 75 weight percent of molecules having the formula

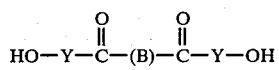

and less than 25 weight percent of the molecules of the formula

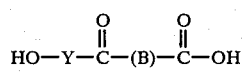

wherein Y is a univalent radical of an aminoalcohol selected from the group consisting of aminoalkanols containing 2 to 12 carbon atoms and aminocycloalkanols containing 6 to 12 carbon atoms, and one primary or secondary hydroxyl group and one primary or secondary amine group in the aminoalcohol molecule as the sole reactive groups in the said aminoalcohol molecule, and (B) is a polymer backbone consisting of carbon-carbon linkages of (1) 60 to 100 percent by weight of vinylidene monomers selected from the group consisting of monoolefins containing 2 to 14 carbon atoms, dienes containing 4 to 10 carbon atoms, vinyl alkyl ketones wherein the alkyl radicals contain 1 to 8 carbon atoms, vinyl and allyl alkyl ethers wherein the alkyl radicals contain 1 to 8 carbon atoms, acrylic acids and acrylates having the formula

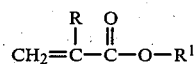

wherein R is hydrogen, an alkyl or hydroxylakyl radical containing 1 to 3 carbon atoms and $R^1$ is hydrogen, an alkyl or hydroxyalkyl radical containing 1 to 18 carbon atoms, an alkoxyalkyl, alkylthioalkyl or cyanoalkyl radical containing 2 to 8 carbon atoms, (2) 0 to 40 weight percent of vinylidene comonomers selected from the groups consisting of vinyl aromatics having the formula

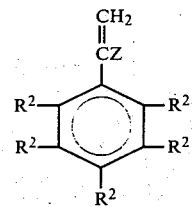

wherein Z is hydrogen or methyl, $R^2$ is hydrogen, halogen or an alkyl or hydroxyalkyl radical containing from 1 to 4 carbon atoms; vinyl nitriles having the formula

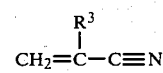

wherein $R^3$ is hydrogen or an alkyl radical containing 1 to 3 carbon atoms; acrylamide, methacrylamide, N-methylol acrylamide and N-methylol methacrylamide; hydroxy-containing vinylidene monomers selected from the group consisting of allyl alcohol, vinyl benzyl alcohol vinyl acetate, vinyl maleate, and vinyl fumarate; vinyl and vinylidene halides; and (3) 0 to 20 weight percent of vinylidene monomers selected from the group consisting of acrolein, methacrolein divinyl ether, methallyl chloride, itaconic acid, vinyl chloroacetate, allyl chloroacetate, vinyl crotonate, vinyl cyclohexene, vinyl ethyl fumarate, nitrostyrene, methoxy styrene, chloroprene, vinyl naphthalene, vinyl piperidine, vinyl pyridine, N-vinyl pyrrolidone, vinyl stearate, vinyl sulfanilic acid, methyl vinyl sulfone, chloroethyl vinyl ether, vinyl benzychloride, β-chloroethyl vinyl phosphonate and diacetone acrylamide, said hydroxyl-terminated liquid polymer containing 1.7 to 10 hydroxyl groups per molecule.

2. A hydroxyl-terminated liquid polymer of claim 1 wherein Y is

$(CH_2)_n$ and n is a number from 1 to 12, or an alicyclic or alkyl substituted alicyclic radical containing 6 to 12 carbon atoms, X is hydrogen or an alkyl radical containing 1 to 8 carbon atoms, and (1) is butadiene-1,3 or an alkyl acrylate wherein R is hydrogen and R' is an alkyl group containing 1 to 8 carbon atoms, (2) and (3) are selected from the group consisting of styrene, acrylonitrile, acrylamide or methacrylamide, vinyl acetate, vinyl chloride, vinylidene chloride, hydroxyalkyl acrylates containing 1 to 8 carbon atoms in the hydroxyalkyl group, N-vinyl-2-pyrrolidone, acrylic and methacrylic acid, and the average number of hydroxyl groups per molecule is from 1.8 to 4.

3. a hydroxyl-terminated liquid polymer of claim 2 wherein Y is

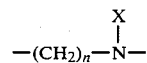

and n is a number from 2 to 6.

4. A hydroxyl-terminated liquid polymer of claim 3 wherein (2) and (3) are 0.

5. A hydroxyl-terminated polymer of claim 4 wherein (1) is butadiene-1,3.

6. A hydroxyl-terminated polymer of claim 4 wherein (1) is an alkyl acrylate and $R^1$ contains 2 to 4 carbon atoms.

* * * * *

UNITED STATES PATENT AND TRADEMARK OFFICE
CERTIFICATE OF CORRECTION

PATENT NO. : 4,489,008
DATED : December 18, 1984
INVENTOR(S) : Changkiu Keith Riew It is certified that error appears in the above-identified patent and that said Letters Patent are hereby corrected as shown below:

Claim 2, line 4 "$(CH_2)_n$ and n is a number from 1 to 12,"

should read --A is $(CH_2)_n$ and n is a number from 1 to 12,--

Signed and Sealed this

Twenty-first Day of January 1986

[SEAL]

Attest:

DONALD J. QUIGG

Attesting Officer

Commissioner of Patents and Trademarks